(No Model.)
C. JAKSON.
REIN GUARD.
No. 570,097. Patented Oct. 27, 1896.
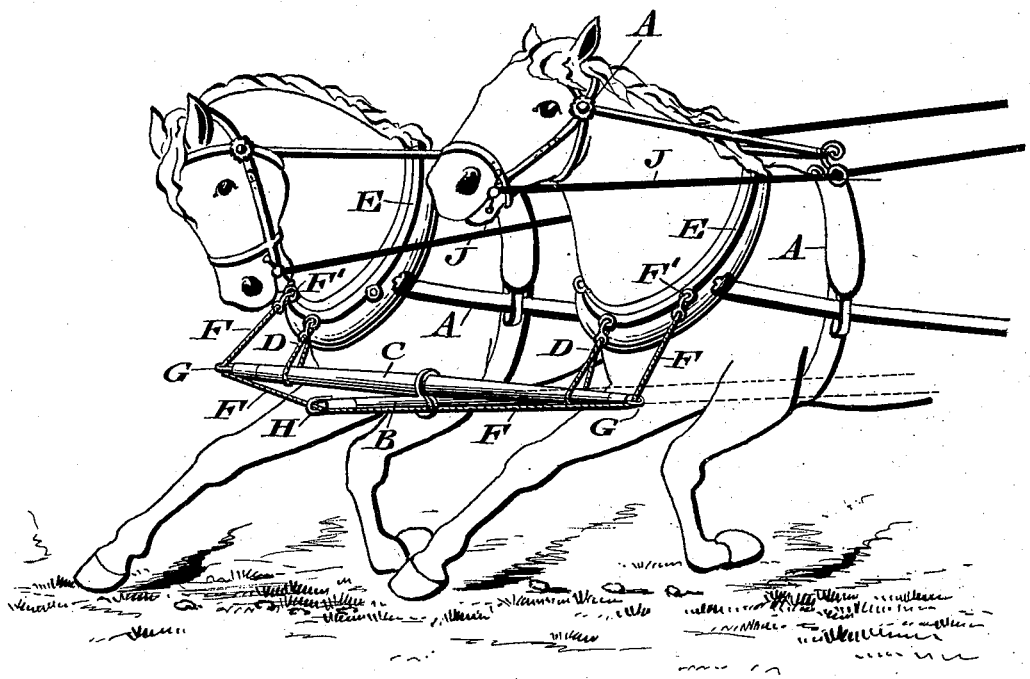
WITNESSES:
P. H. Eagle.
L. Douville.
INVENTOR
Charles Jakson.
BY John A. Niedershein
ATTORNEY.

UNITED STATES PATENT OFFICE.

CHARLES JAKSON, OF PHILADELPHIA, PENNSYLVANIA.

REIN-GUARD.

SPECIFICATION forming part of Letters Patent No. 570,097, dated October 27, 1896.

Application filed March 2, 1896. Serial No. 581,498. (No model.)

*To all whom it may concern:*

Be it known that I, CHARLES JAKSON, a citizen of the United States, residing in the city and county of Philadelphia, State of Pennsylvania, have invented a new and useful Improvement in Rein-Guards, which improvement is fully set forth in the following specification and accompanying drawing.

My invention has for its object an attachment to the breast-bar or neck-yoke of the pole of a vehicle whereby should the driving reins or lines drop or slack from any cause and reach the said yoke and pole they will not catch thereunder. To this end I employ straps or cords which are connected with the neck-yoke, the pole of the vehicle, and the harness in such manner as to close the spaces between said extremities and harness and thus deflect the reins or lines when tightened or drawn up.

The figure represents a perspective view of a rein-guard embodying my invention, including the forward extremity of a pole, the breast-bar, and a span of horses to whose harness the device is applicable.

Referring to the drawing, A designates parts of harness, and B the pole of a vehicle. C designates the breast-bar or neck-yoke, which is held upon said pole in any convenient manner and has its ends engaged by the straps D, which are fastened to the collars E.

F designates a strap or cord which has its ends attached in the present case to the eyes F' of the harness or collars E, then passes forwardly therefrom outside of the carrying-straps F, and is passed through the eyes G at the extremities of the breast-bar C and the eye H of the pole B, whereupon it will be seen that when the reins slacken and hang to such an extent as to come below the breast-bar or the pole, or both, they will not be liable to be caught under the latter, since the strap or cord F, by reason of its extension from the harness to the breast-bar and pole, forms deflectors which tend to throw the reins J from said bar and pole, thus avoiding engagement of the reins therewith. The said strap F serves also as a reinforce for the straps D.

Having thus described my invention, what I claim as new, and desire to secure by Letters Patent, is—

1. In double harness, the combination with a pole and breast-bar of the cord or chain F, which passes from the harness through the side ends of said bar, and angularly from the latter, through the front end of said pole, and the supporting-straps D, which extend from the harness to said bar within the side portions of said cord or chain, substantially as described.

2. In double harness, a pole with an eye on its front and a breast-bar with eyes on its sides, the eye of the pole being set forward of the eyes of the bar, in combination with a rope or chain which is provided with harness-attaching devices and extends forwardly from the harness through the eyes of the said bar, and angularly from the latter through the eye of the pole, substantially as described.

CHARLES JAKSON.

Witnesses:
JOHN A. WIEDERSHEIM,
E. H. FAIRBANKS.